(12) United States Patent
Howard et al.

(10) Patent No.: US 7,944,215 B2
(45) Date of Patent: May 17, 2011

(54) DETECTOR

(76) Inventors: Mark Anthony Howard, Worlington (GB); Darran Kreit, Foxton (GB)

( * ) Notice: Subject to any disclaimer, the term of this patent is extended or adjusted under 35 U.S.C. 154(b) by 977 days.

(21) Appl. No.: 11/721,724

(22) PCT Filed: Dec. 14, 2005

(86) PCT No.: PCT/GB2005/004831
§ 371 (c)(1),
(2), (4) Date: Jun. 14, 2007

(87) PCT Pub. No.: WO2006/064234
PCT Pub. Date: Jun. 22, 2006

(65) Prior Publication Data
US 2010/0045360 A1    Feb. 25, 2010

(30) Foreign Application Priority Data

| Dec. 14, 2004 | (GB) | ................................... 0427411.4 |
| Apr. 15, 2005 | (GB) | ................................... 0507656.7 |
| May 9, 2005 | (GB) | ................................... 0509360.4 |
| May 12, 2005 | (GB) | ................................... 0509702.7 |

(51) Int. Cl.
*G01R 27/28* (2006.01)
(52) U.S. Cl. ........... 324/654; 341/32; 336/84 C; 336/79; 336/232; 345/174
(58) Field of Classification Search .................... 324/654
See application file for complete search history.

(56) References Cited

U.S. PATENT DOCUMENTS

| 4,109,630 | A | * | 8/1978 | Richeson et al. | ............. 123/615 |
| 4,253,079 | A | * | 2/1981 | Brosh | .......................... 336/84 C |
| 4,494,109 | A | * | 1/1985 | Bernin | ............................ 341/32 |
| 5,675,359 | A | * | 10/1997 | Anderson | ...................... 345/161 |
| 2003/0063427 | A1 | * | 4/2003 | Kunihiro | ....................... 361/277 |
| 2003/0221946 | A1 | * | 12/2003 | Kikuchi | ......................... 200/517 |
| 2004/0031908 | A1 | * | 2/2004 | Neveux et al. | ................ 250/221 |

FOREIGN PATENT DOCUMENTS
EP      1422492     5/2004
GB      2071334     9/1981
* cited by examiner

*Primary Examiner* — Timothy J Dole
*Assistant Examiner* — Benjamin M Baldridge
(74) *Attorney, Agent, or Firm* — Renner, Otto, Boisselle & Sklar, LLP

(57) ABSTRACT

A device for measuring the position of a first body relative to a second body comprising: a first body which further comprises an electrical intermediate device; a second body which further comprises at least two inductors energised with an alternating current and at least one of which is formed by a planar spiral winding on a printed circuit board normal to the measurement axis and attached to the second body; arranged such that displacement of the electrical intermediate device causes a change in inductance of the planar spiral winding and whereby measurement of the ratio of the inductances indicates the position of the first body relative to the second.

13 Claims, 11 Drawing Sheets

DETECTOR

FIELD OF THE INVENTION

This invention relates to an inductive detector operable to measure the relative displacement of two or more bodies which has particular, but not exclusive, relevance to user elements in man-machine interfaces.

REVIEW OF THE ART KNOWN TO THE APPLICANT

A common position detector or user element in man-machine interfaces is the push button. Push buttons typically detect a user's input by making or breaking electrical contacts. Such push buttons generally work well but suffer from reliability problems in harsh environments where foreign matter such as water, condensation, dirt or grease, can interfere with the electrical contacts. There are particular problems in some environments such as petrochemical plants or mines where the spark from an electrical contact may cause an explosion.

Capacitive detectors or switches have been utilised to overcome many of the problems associated with electrical contacts. In this type of switch, the change in capacitance, caused by the presence of a user's finger adjacent to the plates of a capacitor, is electronically sensed. Whilst overcoming the traditional problems with electrical contacts, capacitive sensors are typically unable to differentiate between a user's finger or a water droplet, for example. As such, they are not especially reliable or safe for many applications such as kitchen appliances or industrial systems where foreign matter near to the user interface is common. There are further problems regarding temperature drift and typically each input requires its own electronic circuit local to each sensing point. This can be prohibitively expensive in many applications that require a multiplicity of input points.

Infra red touch sensors have been utilised to overcome the problems normally associated with capacitive sensors. Such infra red systems can differentiate between a user's finger and a water droplet, for example, but they are expensive and need a transparent panel such as glass or plastic between switch and user.

The author has previously disclosed various methods of sensing a user's input. Typically the disclosures teach an inductive method using at least two planar transmit windings as a magnetic field generator, a receive winding and electrical intermediate device (EID). The technique utilises transmission and reception of high frequency radio waves modulated by a lower frequency whereby the position of the EID is determined by the phase shift of the received signal relative to the transmitted signal. Whilst functional and effective, the method is sophisticated and best suited to highly precise measurements. The cost of the relatively complex electronics circuit is prohibitively expensive in some applications and the use of a relatively low modulation frequency limits speed of operation. Furthermore, the invention requires relatively sophisticated and hence expensive, multi-layer winding arrangements at the sensing area.

U.S. Pat. No. 4,253,079 describes a construction method for a linearly variable differential transformer (LVDT) using a stack of printed circuit boards arranged around a cylindrical EID. The LVDT construction requires the use of a primary winding and at least two secondary windings. The construction advantageously uses modern PCB techniques and spiral windings however it also requires a central aperture, multiple wafers and a relatively complex winding geometry with a plethora of interconnections between the various wafers.

This invention provides a simple, robust and inexpensive inductive method and apparatus for detecting the relative displacement of two bodies.

SUMMARY OF THE INVENTION

In its broadest aspect, the invention provides a device for measuring the position of a first body relative to a second body along an axis comprising: a first body which further comprises an EID; at least two inductors energised with an alternating current and at least one of which is formed by a planar spiral winding on a printed circuit board normal to the measurement axis and attached to the second body; arranged such that displacement of the EID causes a change in inductance of the planar spiral winding and whereby measurement of the ratio of the inductances indicates the position of the first body relative to the second.

Preferably the EID is a magnetically permeable element such as a ferrite or a conductive element such as a copper cylinder.

Preferably the printed circuit board has a hole in the centre of the windings through which the EID may pass.

Preferably the EID is connected to a user element in a man-machine interface.

Preferably the user element forms part of a fascia panel or impermeable membrane which separates the external environment from the detector.

Preferably the panel is injection moulded

Preferably the panel is made from sheet steel.

Preferably the user element is a touch detector.

Preferably the small deflections caused by a user's input are amplified using a lever arrangement.

Preferably the man-machine interface is a keyboard.

Preferably the user element is a joystick.

Preferably the user element is a touch pad or touch screen.

Preferably the detector is operable as an impact detector.

Preferably the detector is operable as an impact detector on an industrial door.

Preferably the detector is controlled by an electronics circuit which outputs an electrical signal in proportion to the displacement of the EID relative to the windings.

Preferably the displacement is calculated by comparing the ratio of the inductance values of the two windings.

Preferably the electronic circuit controls multiple sets of EIDs and windings by time division multiplexing.

BRIEF DESCRIPTION OF THE DRAWINGS

In the accompanying drawings.

DESCRIPTION OF THE PREFERRED EMBODIMENT

Figure 1:
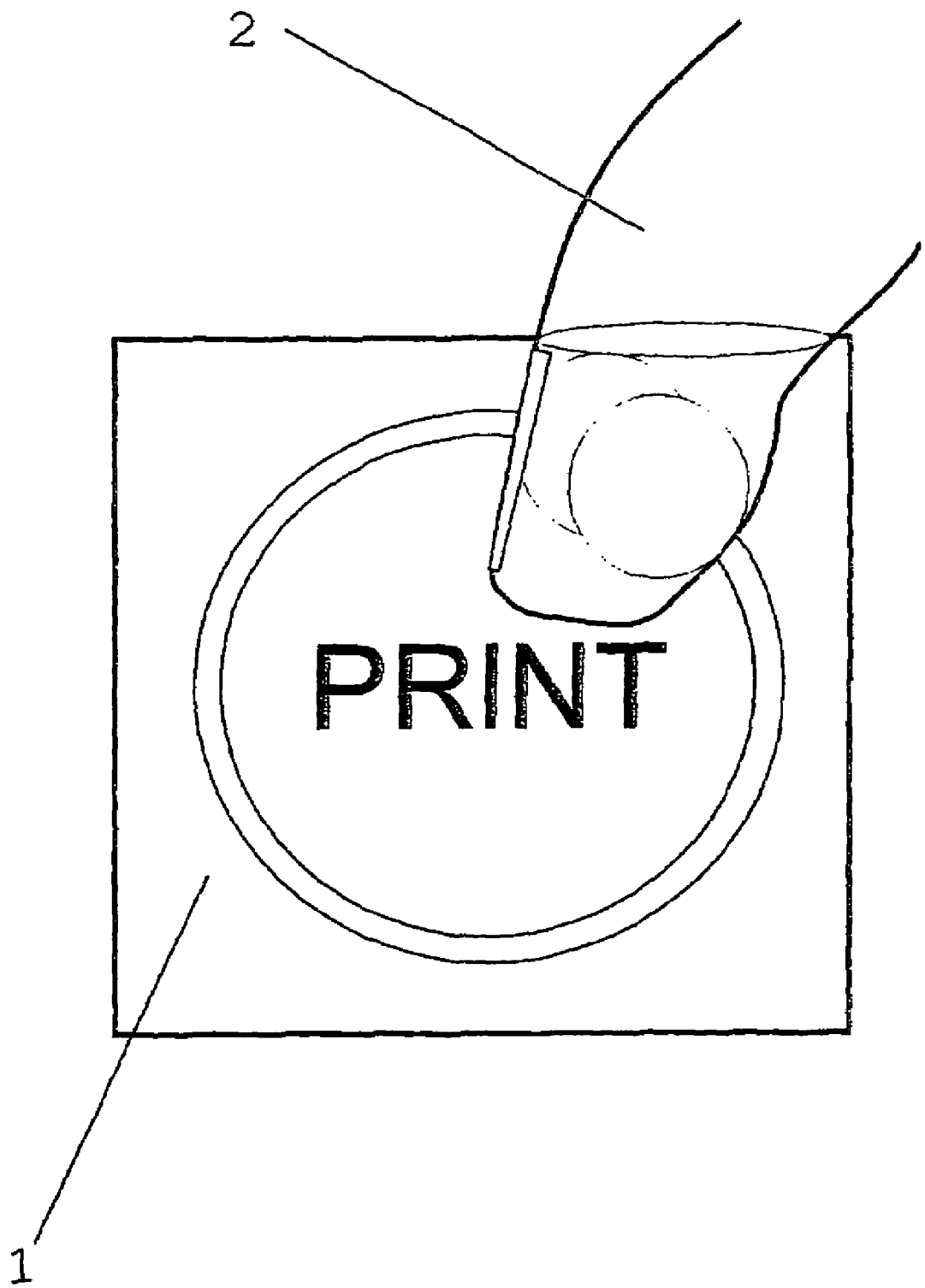
FIG. 1 shows a plan view of a push button.

FIG. 1 shows a plan view of a man-machine interface push button. In this case a printer button is used as an example. A substantially impermeable, protective fascia panel [1] is printed with user instructions. The panel is formed by an injection moulding of a glass filled polymer such as nylon. The panel protects the inside of the printer from the external environment for reasons of safety, hygiene and reliability. A user's finger [2] presses down on the panel [1]. The detector is located behind the push button but is not shown here for clarity. Only one push button is shown in FIG. 1 for reasons of clarity but usually, several push buttons are located on a keyboard or control panel.

Figure 2:
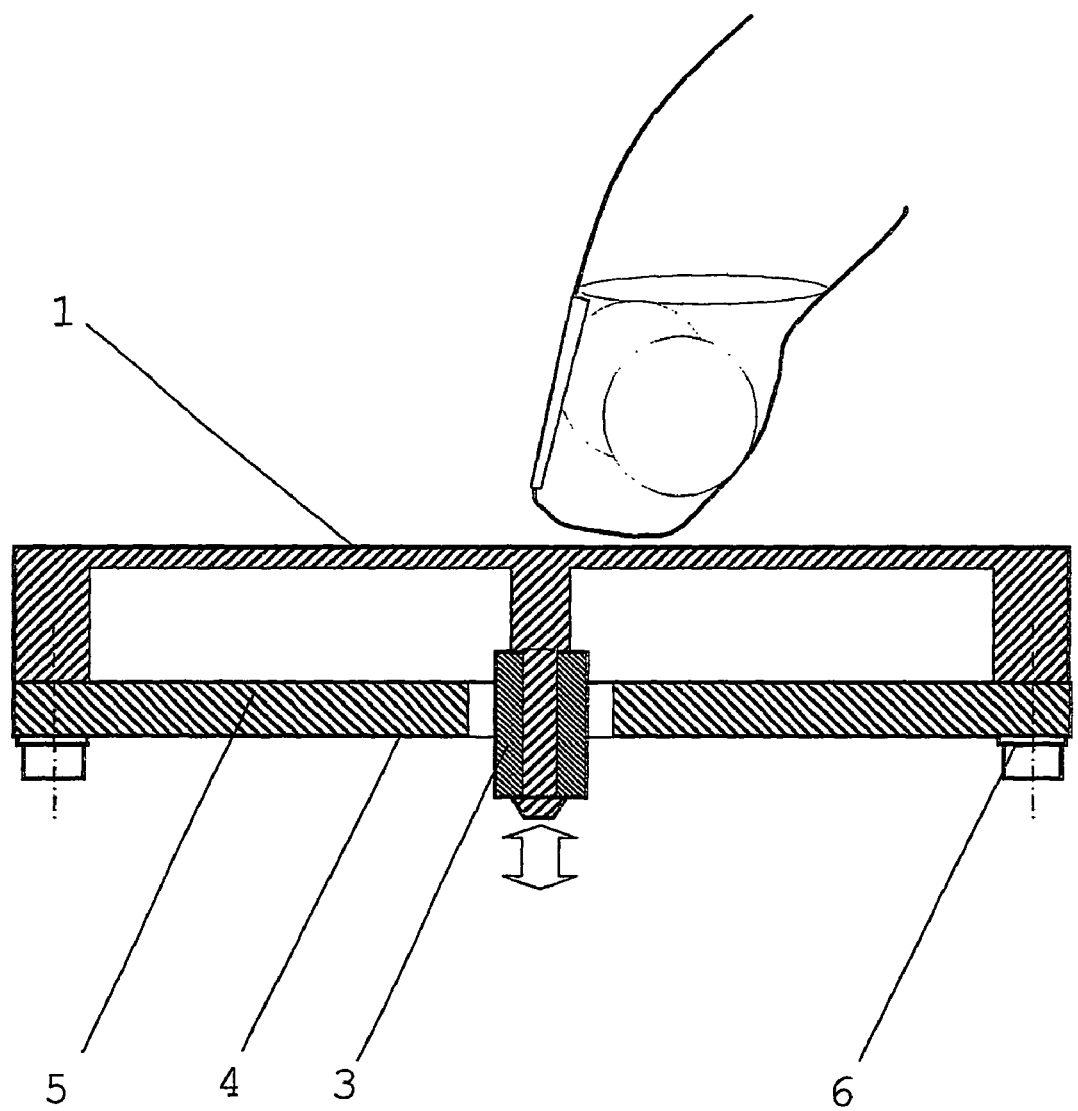
FIG. 2 shows a section through the centre line of a push button form of the detector.
Figure 3:
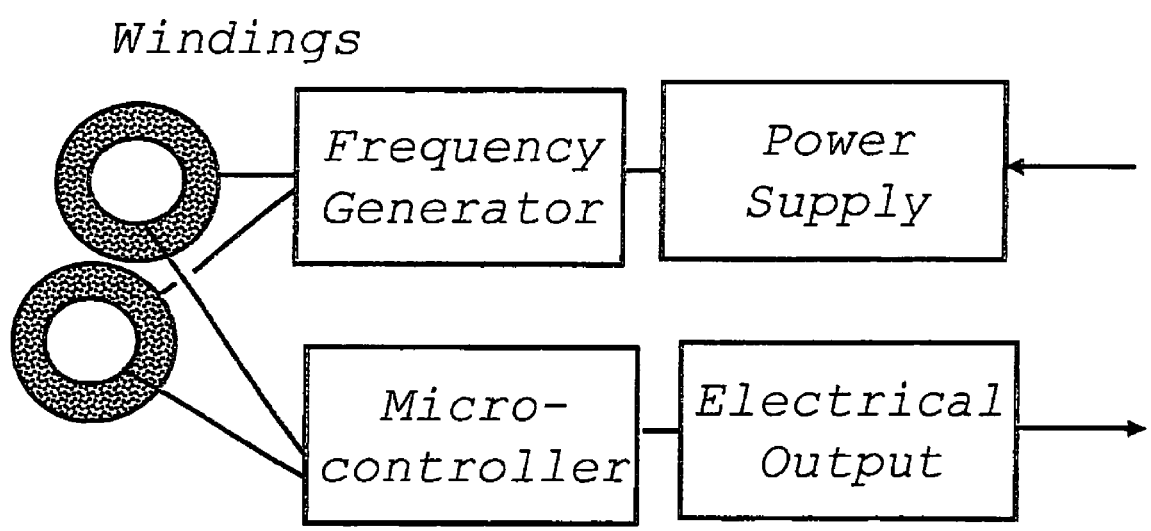
FIG. 3 shows a simplified schematic of the electrical circuit used to control the detector.

FIG. 2 shows a sectional view of a preferred embodiment of the man-machine interface push button in which an EID [3] is secured to a panel [1] by heat staking. Preferably, the ED [3] is a ferrite or alternatively, an electrically conductive element such as a copper cylinder. Any deflection of the panel [1] causes displacement of the EID [3] normal to a pair of inductances [4] formed as spiral tracks on each side of a 2 layer printed circuit board (PCB) [5]. The PCB [5] is secured to the impermeable panel [1] by self tapping screws [6]. A through hole in the PCB [5] inside the inductance's windings [4] surrounds the EID [3]. Whilst a through hole is preferred, it is not strictly necessary since the EID [3] may still deflect toward the inductances [4] without a hole FIG. 3 shows a simplified schematic of an electronic circuit used to measure the value of the two inductances [4] in the detector. The circuit includes a power supply, a frequency generator, the inductances [4], a microprocessor and an electrical output. The power supply is typically rated at 5V DC and 10 milliamps for 100% duty cycle. The frequency generator comprises an oscillator and is capable of generating an AC signal in the range 100 kHz to 10 MHz, but preferably 1 to 2 MHz. There are various techniques which may be deployed to measure the value of an inductance [4] including the use of an inductance bridge, current measurement or the shift in frequency of a tank circuit containing a capacitor in electrical series with the inductor [4]. In the case of a bridge method, one of the inductances [4] may form the reference component or alternatively this may be a discrete inductor, or other planar winding, placed on the PCB [5] away from the sensing point. The specific application and consequent engineering constraints such as space or existing componentry should decide the optimal choice of inductance measurement The circuit in FIG. 3 is shown for purposes of clarity co-operating with a single sensing point. The microcontroller is preferably a flash memory type of device, with analogue inputs, and programmed to suit the particular application. A small amount of additional analogue electronics, for example an amplifier and filter, is often required but is not shown for clarity. The microcontroller may be dedicated to the touch detector system described here but alternatively may also carry out other functions associated with other parts of the host system such as display or motor control. FIG. 3 shows an electrical output being provided to the host system. Preferably this is a serial data stream, for example I²C, but alternatively may be an analogue output such as 0-5V or 4...20 mA.

The electronic circuit may be augmented with an audio signal output. An audible 'click' may be generated when, for example, a detector senses a user's touch. This audio feedback helps compensate for the lack of tactile feedback normally associated with a traditional electromechanical push-button but has the advantage of being programmable to a tone, volume and type ('clic', 'clack', 'tic', 'toc', 'beep' or speech of whatever language etc.) required by the specific application.

In practice, it will be common for the electronics circuit described in FIG. 3 to control multiple inputs. This may be achieved by the simple addition of a multiplexer. Preferably, the circuit is located close to the inductances [4] to avoid any electromagnetic compatibility (EMC) problems. If the circuit is distant by more than a few centimeters from each detector then it is preferable to utilise a small loop area arrangement of conductors between the circuit and the detector in order to avoid EMC problems. This can be carried out using twisted pair cable or alternatively by arranging the tracks of the conductors on various layers of the PCB [5] so as to present the minimum net antenna area. Alternatively, the tracks may be located on the inner layers of multi-layer PCB [5] in which the outer layers are printed with copper planes which act as shielding.

Figure 4:
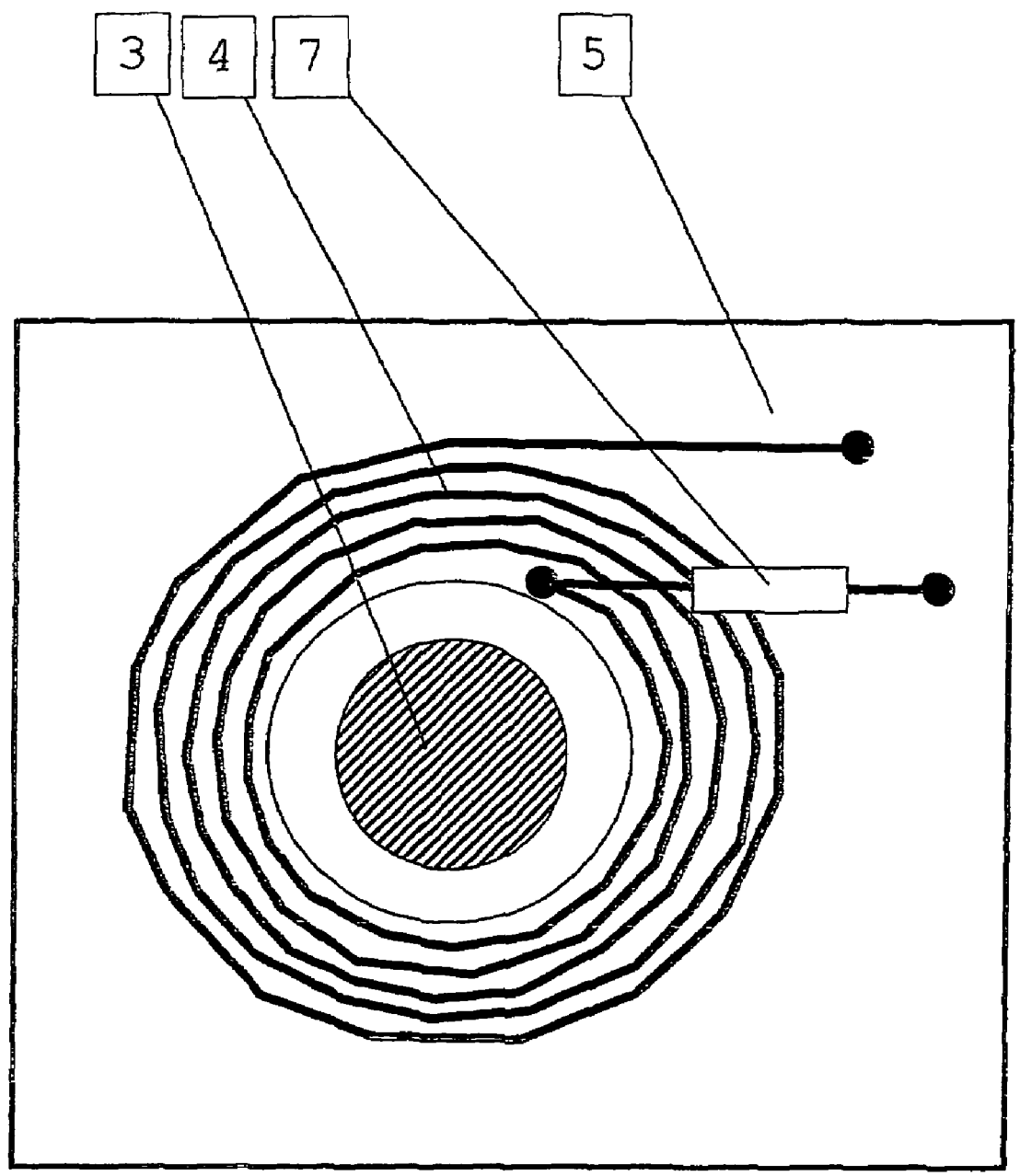
FIG. 4 shows a schematic of an inductor embodied as a planar spiral winding on a single layer printed circuit board.

FIG. 4 shows a schematic of a single inductance [4] embodied on a single layer printed circuit board. The inductance [4] is formed as a spiral winding around of a hole through the printed circuit board [5]. As has already been stated, a hole is not necessary for many applications since the EID [3] can change the inductance value of the winding [4] without passing through the centre of it. The inductance's [4] circuit is completed by taking the conductor at the innermost diameter, by a zero ohms link [7], from the inner diameter to the outer printed circuit terminal. Alternatively a wire bond, connector, jumper or simple insulated wire may be used. It will be appreciated by those skilled in the art that two or more inductances [4] may be simply constructed on various layers of a multi-layer PCB. Such a construction should still be considered planar. Plated via holes in the PCB [5] may be utilised to make electrical connections to the start and end points of the inductance [4].

Figure 5:
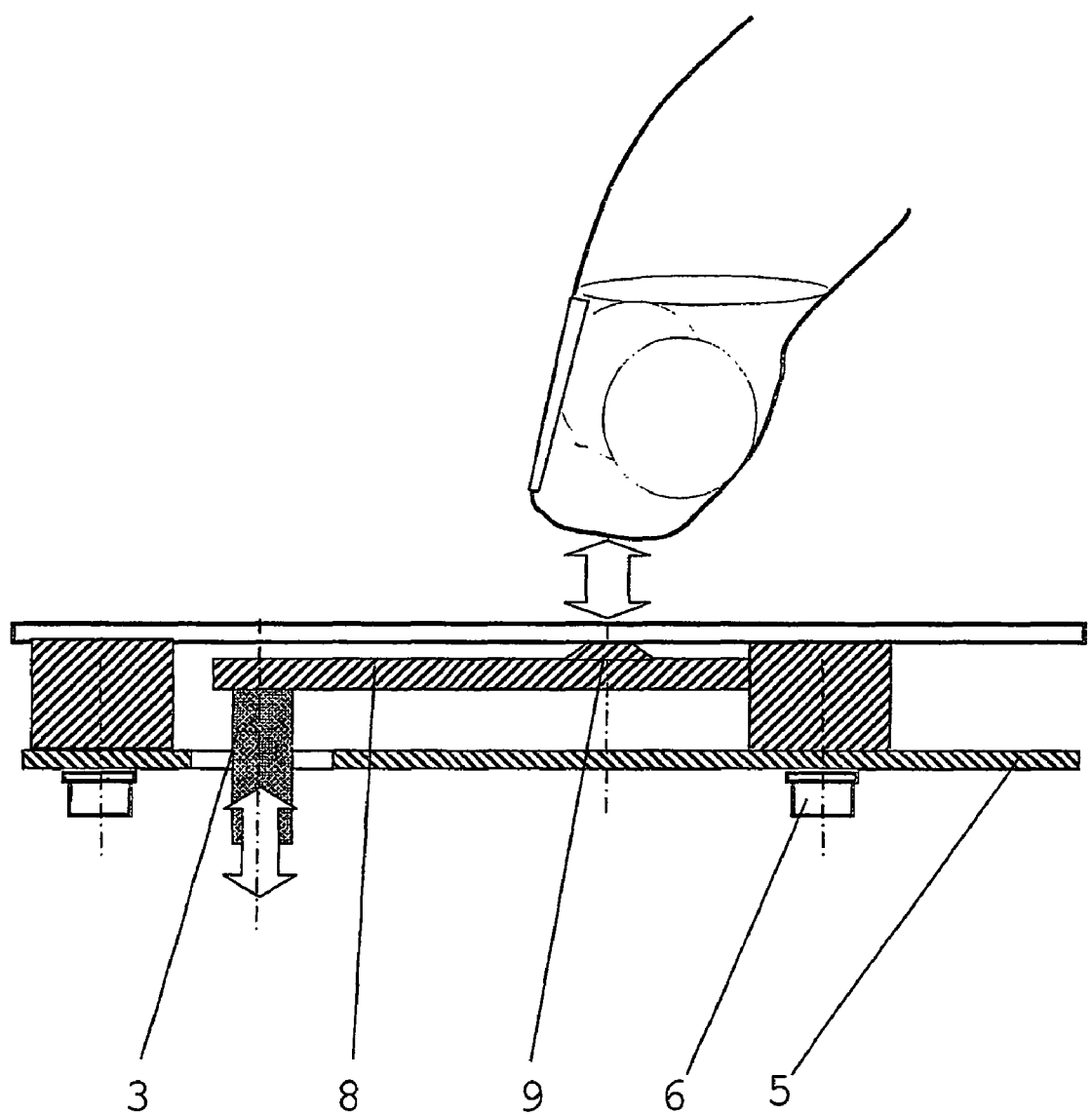
FIG. 5 shows a mechanical arrangement used to amplify the deflection of a stiff panel such as a stainless steel sheet fabrication.

FIG. 5 shows a sectional view of a mechanical arrangement used to amplify the small displacement of a stiff panel [1] such as a stainless steel sheet fabrication common in kitchen appliances, for example. A larger deflection can be provided by mechanical amplification cantilever or lever means. The mechanical amplifier is preferably made from an injection moulding [8] which is secured to the rear face of the panel [1]. An EID [3] such as a ferrite slug is heat staked to the injection moulding [8]. A cantilever extends from the moulding [8] behind the area where the user input is located. A bump [9] on the cantilever touches the back of the panel [1] at approximately the point where the user's finger [2] is most likely to touch. The ratio of the distances from bump [9] to moulding [8] and moulding [8] to the EID [3] is proportional to the desired mechanical amplification factor.

Modifications and Further Embodiments

Importantly, the PCB [5] containing the inductances [4] may also carry other electronic elements such as light emitting diodes (LED's) or displays. LED's may be viewed through the panel by the provision of transparent windows. The invention has particular utility with printed electroluminescent (EL) inks co-operating with conductive inks. The invention has particular utility with EL devices which would traditionally utilise membrane switches. Printed EL systems comprising multiple sheets may be located above or below panel [1].

It should be noted that whilst two inductances [4] may be used for the preferred ratiometric measurement method, it is preferable, but not necessary, for both the inductances to be centred on the EID [3]. Only one inductance [4] needs to be located adjacent to the BID [3]. The second may be a reference winding used by more than one detector and located centrally away from any one particular EID [3]. For example, a single reference inductance may be used with another 12 inductances for the 12 keys typically used for an alphanumeric keypad.

The provision of multiple detectors has already been discussed in which the operation of each detector is considered individually by a centralised electronics circuit. For example, on a keyboard one input generates input 'Q' and a second generates input 'W' and so on.

Figure 6:
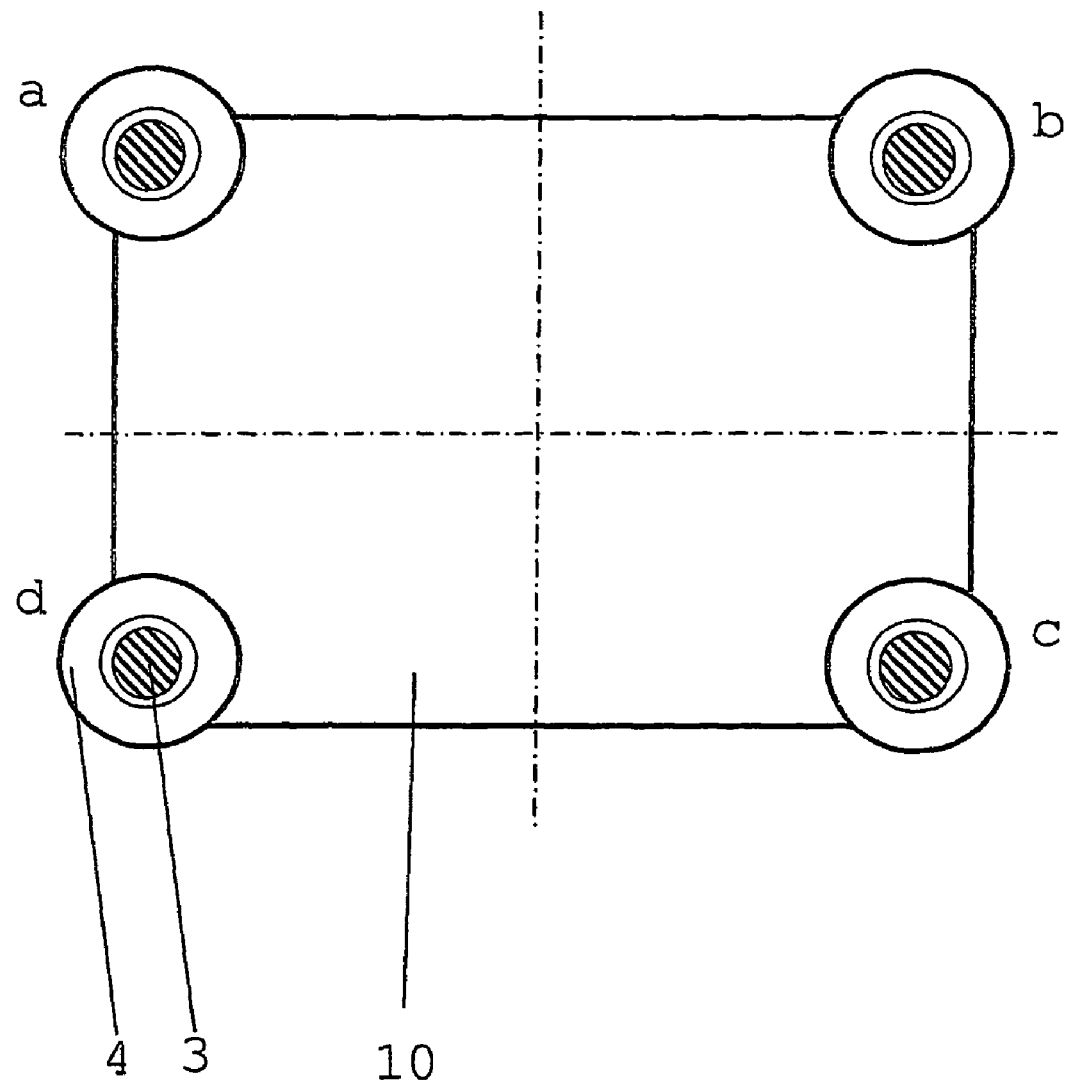
FIG. 6 shows in plan (rear) view an arrangement of a touch screen comprising 4 detectors located at each corner of the screen.
Figure 7:
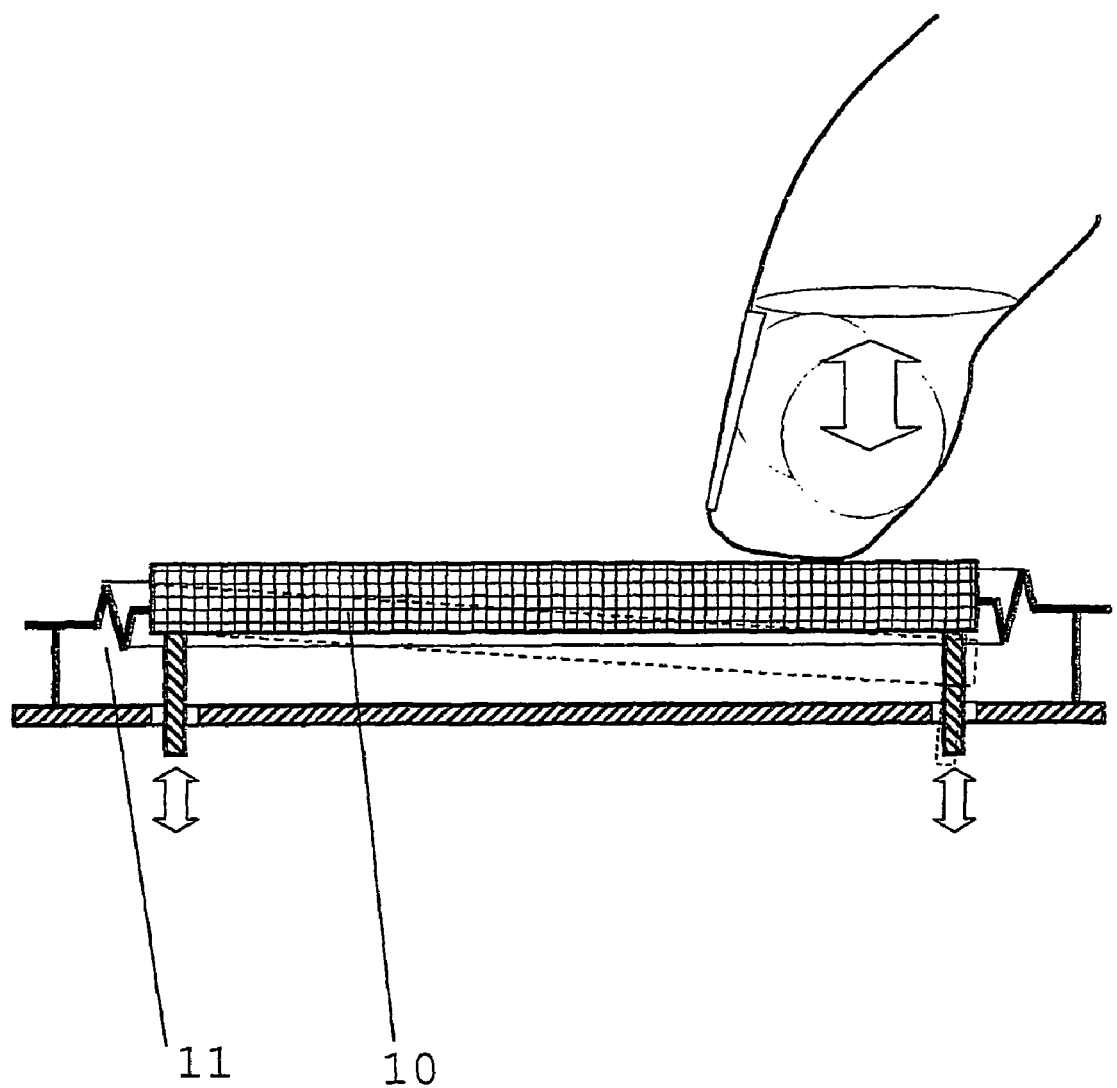
FIG. 7 shows a sectional view of a touch screen comprising 4 detectors located at each corner of the screen.

Inputs from multiple detectors may also be used in combination to determine user input For example, four detectors [a, b, c & d] may be located at each corner of a transparent screen [10] as shown in (rear view) FIG. 6. FIG. 7 shows a sectional view of the same. A visual display unit (VDU) is located beneath the transparent screen [10]. The screen [10] is held in place by a mechanical bezel [11] which is arranged to be semi-rigid and allow some limited movement mainly in the vertical direction. This deflection is accommodated by a concertina type rib in the bezel [11] as shown in FIG. 7. The content of the VDU is known by a host controller and is visible by a user. When prompted to do so, for example with answers to a question 'Yes' or 'No', a user may be prompted to touch the screen [10]. If the answer 'yes' is located on the left hand side of the screen then finger pressure on the left hand side would be indicated by a downward movement of detectors marked b and c, and negligible movement of detectors a and d. The position of a finger at various points of the screen can be calculated by comparing the readings of each of the four detectors [a, b, c & d]. This may be carried out initially using a teach mode and then capturing the data in electronic memory as a look up table. Greater resolution may be achieved by the addition of further detectors at the centre line of the screen [10], for example.

Figure 8:
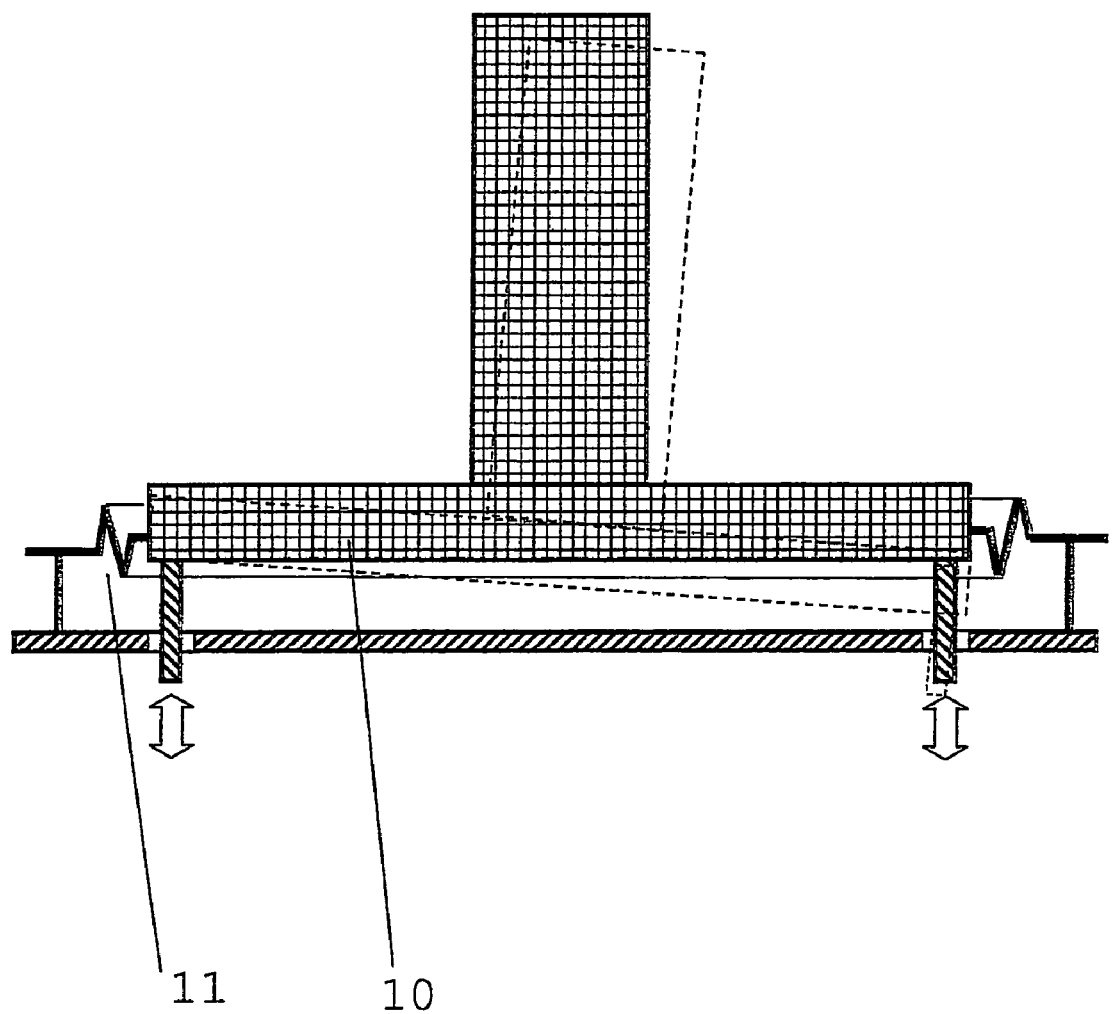
FIG. 8 shows a sectional view of a joystick.

FIG. 8 shows an alternative embodiment of a system in which the output of several detectors is utilised to determine user input. In FIG. 8, a post is attached to the screen [10] so as to form a joystick. The screen [10] does not need to be rectangular. An annular arrangement is possible co-operating with 3 detectors. A linear or 1-dimensional control is possible co-operating with 2 detectors.

The screen [11] may be opaque so as to form a touch panel. Such 2-dimensional systems may be used for cursor control with a computer, for example.

In systems using multiple detectors, the effects of vibration may be negated by the use of common mode reaction algorithms contained in software. In such algorithms, transient deflections which are common to multiple detectors are ignored and only those relatively low frequency deflections from detectors which differ to others are acted upon.

In a push button [1] the characteristics of a single user input may be taught. The characteristics of a person keeping a finger in place can also be taught Further, the degree of pressure, in other words the degree of deflection, may also be input to the host system, for example, to increase or decrease the rate at which a control parameter is altered. For example, if someone presses harder, the displayed time of a digital clock may be incremented more quickly and vice versa.

Figure 9:
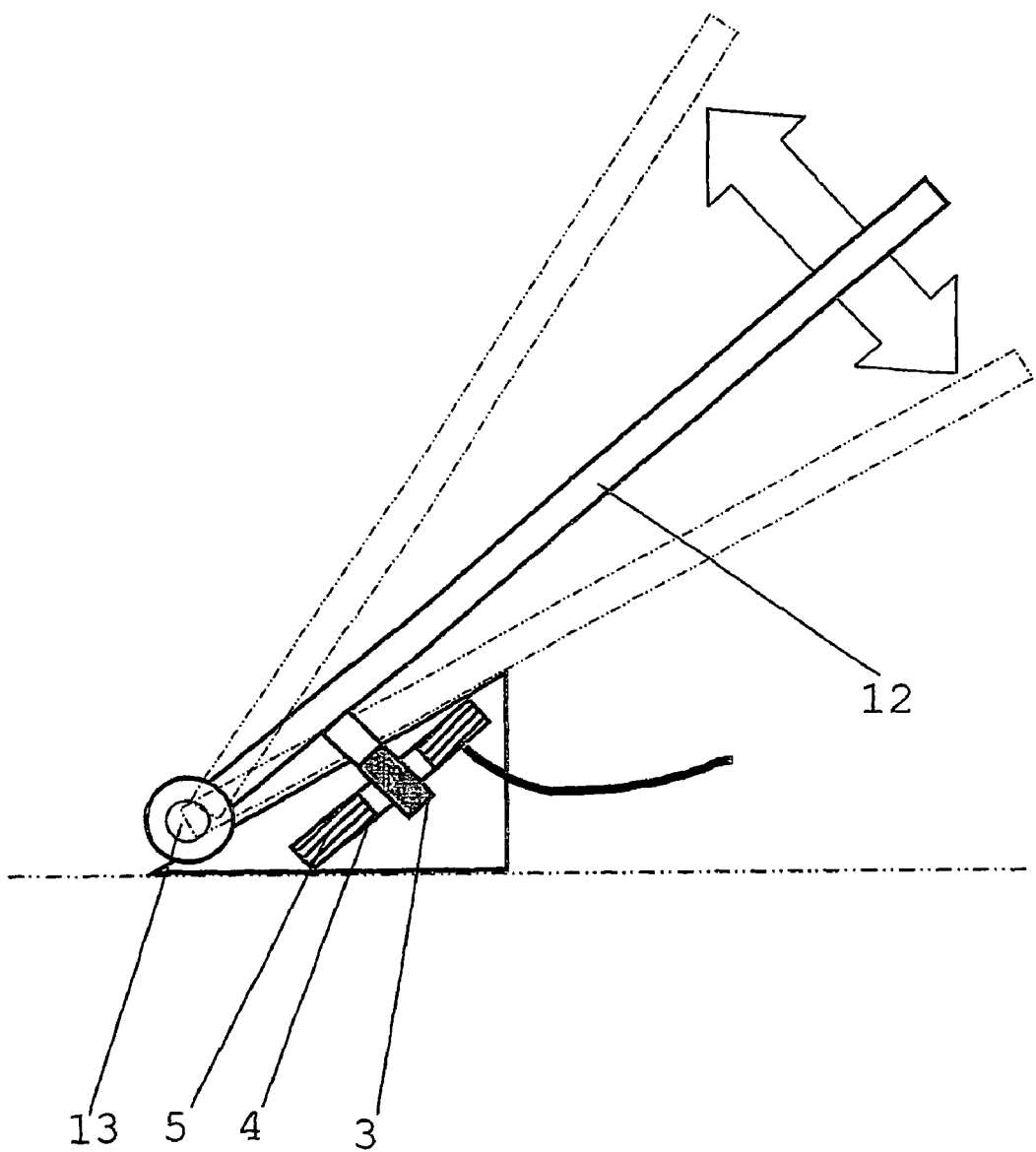
FIG. 9 shows a sectional view of the detector cooperating with an automotive pedal.

FIG. 9 shows a sectional view of an alternative embodiment of the detector in an automotive pedal. This is an alternative man-machine interface which uses a person's foot rather than his or her hand. The arrangement comprises a sprung loaded pedal [12] which pivots about a mechanical arrangement [13]. As the pedal moves between its upper and lower limits the EID [3] moves relative to an inductance [4] on a printed circuit board [5]. The change in inductance caused by the EID [3] moving relative to the inductance [4] is indicative of the downward foot force and hence position of the pedal [12]. Such indication may be taken by a host control system to regulate the flow of fuel to the vehicle's engine, for example. The arrangement is suited to accelerator, brake, clutch and other pedals used in vehicles.

Figure 10:
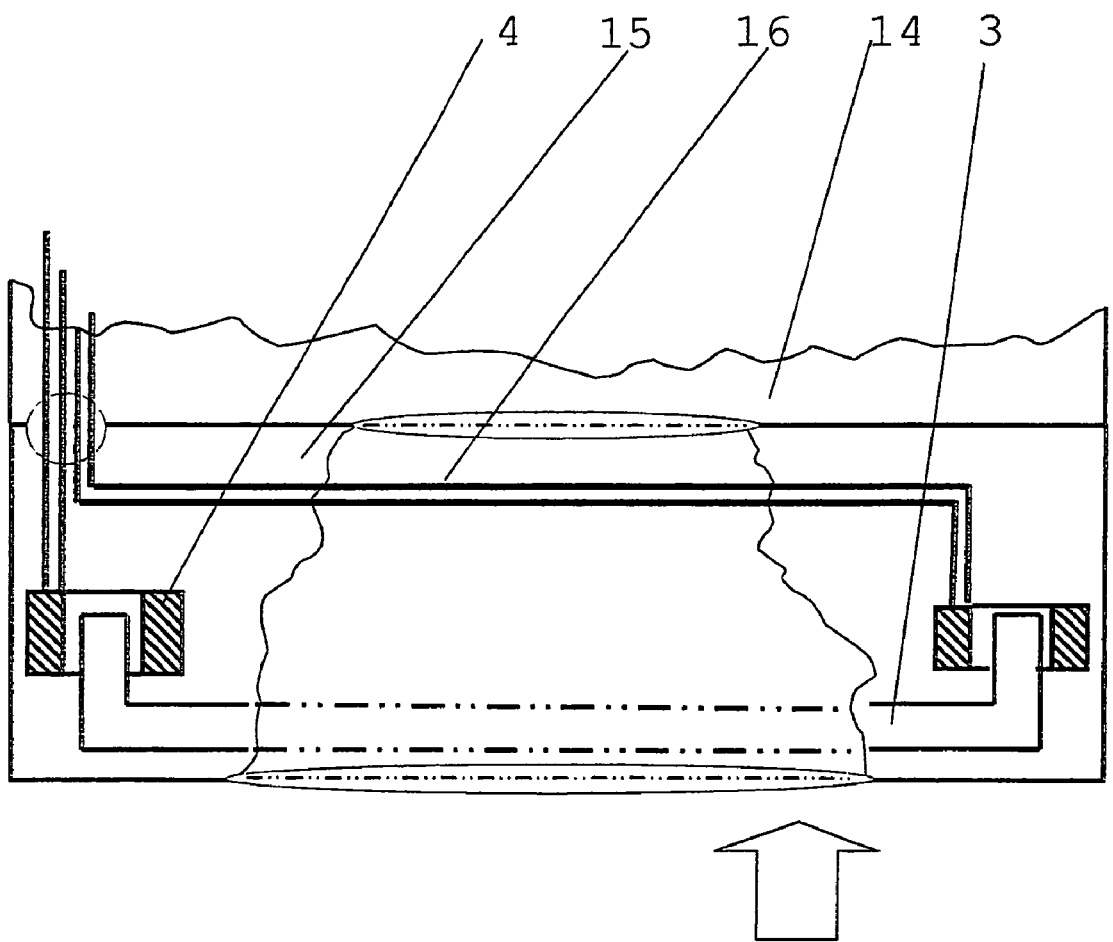
FIG. 10 shows a schematic side view of the detector as an impact detector on an industrial door.

FIG. 10 shows a schematic of the invention as an impact senor and, in this instance, on an industrial shutter door [14]. A magnetically permeable EID [3] is electrically coupled to two wound inductors [4]. Each inductor is energised with an AC voltage. The EID [3] is held in position in an electrically insulating and flexible extrusion [15] which is operable to form a seal at the bottom of the door's [14] travel. If an impact or user's input presses against the extrusion [15]—as indicated by the arrow—at any point, the relative position of the EID [3] and the windings [4] changes. The ED [3] in this embodiment is arranged such that the ED [3] will move towards the windings [4] under the influence of a user's input [shown by an upwardly pointing arrow in FIG. 10]. Alternatively, the ED [3] may be arranged such that it moves away from the windings [4]. As the relative position changes then the inductance of the windings [4] changes. Such a change may be measured and may be taken as indicative of a user's input or impact. Advantageously, the flexible extrusion houses the interconnecting wires [16].

Figure 11:
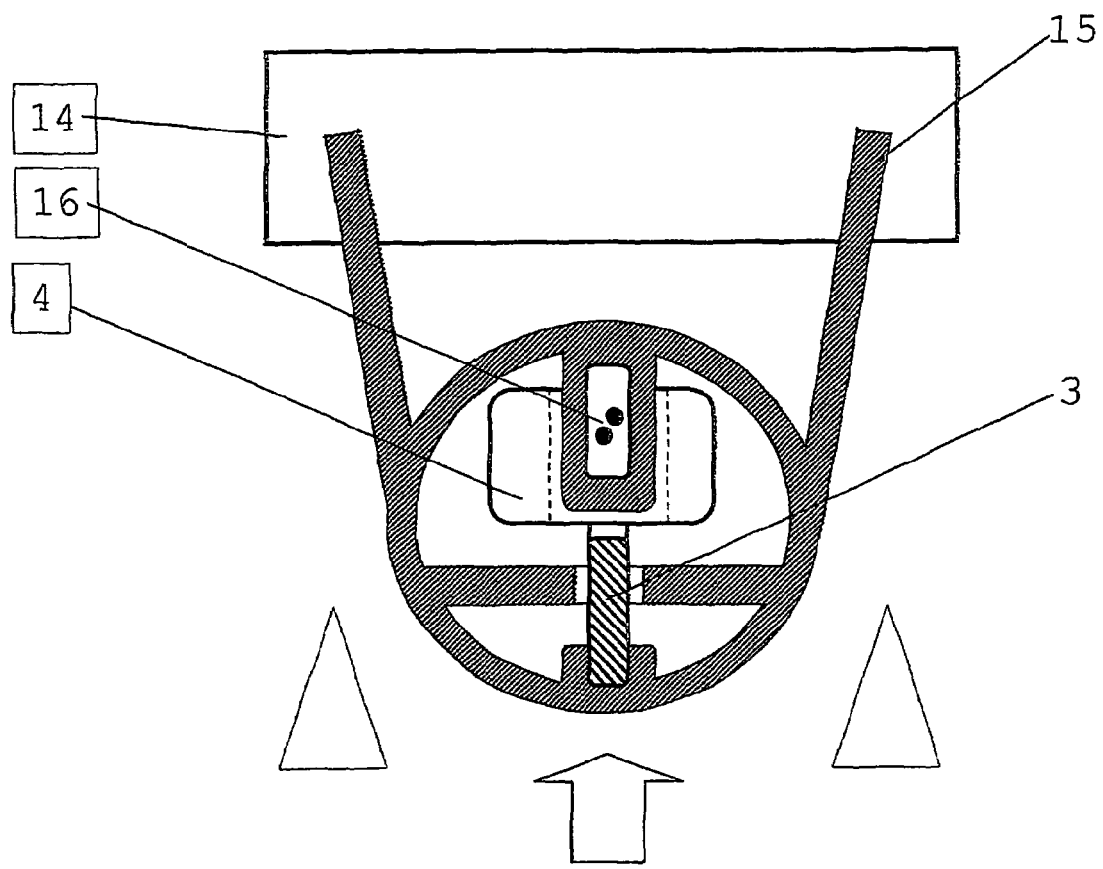
FIG. 11 shows a schematic end view of the detector as an impact detector on an industrial door.

FIG. 11 shows a sectional view of the embodiment as a door [14] impact detector. This view shows the relative position of the ED [3] within the extrusion [15]. The extrusion [15] fits to the bottom of an industrial roller shutter door [14] in order that entrapment of a person or object underneath a powered shutter door may be sensed and hence any damage prevented by shutting power off to the door's [14] drive system. A similar arrangement may be provided in many other situations to avoid trapping such as electrically powered car windows, automatic shop doors, machine guards etc. Preferably, the EIDs [3] should be stiff in order that a user's input is not taken up by flexure rather than physical movement where the separation distance is magnetically significant The electrical part of the invention is simple. Consequently, a second electrical circuit for purposes of electrical redundancy may be provided inexpensively. Given the simple and robust nature of the mechanical aspects of the invention there should be no requirement for mechanical redundancy other than in the most extreme applications. The EID [3] may be inexpensively produced using steels having a high relative permeability such as low carbon or mild steel. Preferably, the EIDs [3] are painted, galvanised or plastic coated to avoid corrosion. Alternatively, the EIDs [3] may be left uncoated since only hugely excessive corrosion will affect the invention's performance. For highly accurate measurement, a second pair of EIDs [3] and a winding [4] may be provided which remain generally unaffected by a user's input Comparison of the two inductances [4] then provides the basis for a ratiometric measurement algorithm. This reference magnetic circuit may be physically smaller if required as long as the effective inductance is similar.

Applications for the invention include but are not limited to push buttons, displacement encoders, position sensors, touch sensors, pinch sensors, impact sensors, 1-dimensional user inputs, 2-dimensional user inputs, joysticks and touch screens in areas including but not limited to actuators, aileron controls, angle sensors, radar antenna tracking, anti-counterfeit devices, audio controls, automatic guided vehicles, automatic teller machines, automation equipment, ball screws, boilers, brake sensors, brake wear sensors, burners, climate controls, cockpit controls, component identification, consumer electronics, cookers, cooking ranges, cooktops, dials, direction indicators, dishwashers, displacement sensors, door travel sensors, elevators, end of shaft encoders, fitness equipment, flow sensors, food mixers, fuel level sensors, fuel metering, games, gauges, giant magnetoresistive sensor replacements, guided vehicle tracking, gunnery sights, Hall affect replacements, headlamp level controls, HVAC sensors, hydraulic actuators, hydraulic valves, identification tags, impellers, inclinometers, indexing tables, indicator gauges, Inductosyn replacements, industrial control panels, joysticks, kitchen goods, lifts, lighting controls, limit switch replacements, linear actuators, liquid level sensors, load sensors, LVDT replacements, machine tools, magnetoresistive sensor replacements, marine engines, marine equipment, mining equipment, missile guidance, motion controllers, motor encoders, odometers, packaging equipment, palletisers, paper thickness sensors, pedal sensors, pen sensing, petrochemical sensors, plotter controls, pneumatic actuators, pneumatic valves, pressure sensors, printer write heads, PRNDL sensors, proximity sensors, push buttons, radar controls, ride height sensors, robots, roll/pitch/yaw sensors, roller separation sensors, rotary encoders, RVDT replacements, safety switches, seating instrumentation, security tags, servo motors, shaft encoders, sheet feeders, skis, sliders, speed sensors, sports equipment, steering angle sensor, steering column controls, stepper motors, strain measurement, suspension dampers, suspension sensors, tachometers, tamper evident devices, throttle controls, tilt sensors, torque sensors, toys, traction control, transmission sensors, turbines, user interface elements, utility meters, valves, velocity sensors, vibration sensors, washing machines, weight sensors, wheel sensors, workpiece identification.

What is claimed is:

1. A detector device for measuring the position of a first body relative to a second body along an axis comprising:
    a first body which comprises an electrical intermediate device;
    said first body further comprising a touch panel which deflects under the influence of a user's touch in order to displace said electrical intermediate device;
    a second body which comprises at least two inductors energized with an alternating current; at least one of which is formed by a planar spiral winding on a printed circuit board whose plane is substantially normal to a measurement axis; and at least one of which is a reference component that is not located on said measurement axis;
    arranged such that displacement of the electrical intermediate device causes a change in inductance of the planar spiral winding and whereby the ratio of the inductances indicates the position of the first body relative to the second;
    wherein the detector is controlled by an electronics circuit which comprises a power supply, a generator circuit, a measurement circuit, a processor, non-volatile memory and an electrical output; and
    wherein said electronics circuit comprises said reference component.

2. A device as claimed in claim 1, wherein the electrical intermediate device is one of: a ferrite cylinder, ferrite component, metal cylinder, metal dowel, metal screw, metal ball, metal disk, or metal washer.

3. A device as claimed in claim 1, wherein the spiral winding is formed on the surface of a single sided printed circuit board and wherein the inside of the spiral winding is connected to an external circuit with one of: a resistor, inductor, capacitor, jumper, insulated wire, connector, or zero ohm link.

4. A device as claimed in claim 1 wherein the spiral winding is formed on a multilayer printed circuit board and wherein the interior of the spiral winding is connected to the exterior via a plated through hole.

5. A device as claimed in claim 1 wherein the electrical intermediate device is arranged to move through a hole substantially in the middle of the planar spiral winding.

6. A device as claimed in claim 1 wherein the device is arranged so as to form a touch detector.

7. A device as claimed in claim 1, wherein the device is arranged to detect the displacement of a screen under a person's touch such that the detector's signal is indicative of the position where the person touches the screen.

8. A device as claimed in claim 1 wherein the device is arranged to detect the displacement of a joystick under a person's touch such that the detector's signal is indicative of the roll, pitch and plunge of the joystick.

9. A device as claimed in claim 1 wherein the device is arranged to detect an impact from a third body on the first two bodies.

10. A device as claimed in claim 1 wherein the first body is a door and the second is a flexible component.

11. A device as claimed in claim 1 wherein the electronics circuit comprises a reference capacitor.

12. A device as claimed in claim 1, wherein the electronics circuit comprises a multiplexer such that the electronic circuit controls a plurality of detectors using time division multiplexing.

13. A system to detect a person's touch, comprising:
    an electrical intermediate device attached to a panel which deflects under the influence of a user's touch in order to displace said electrical intermediate device on a measurement axis;
    a printed circuit board attached to the said panel comprising a first planar spiral wound inductor whose inductance value will be changed by displacement of the electrical intermediate device on the measurement axis normal to the printed circuit board; and
    a second inductor that is not located on the measurement axis of said spiral wound inductor wherein the first and second inductors are energized with an alternating current, and wherein a change in the inductance value ratio between the spiral wound inductor and a second inductor indicates that a person has touched the panel.

* * * * *